(12) United States Patent
Chatterjee et al.

(10) Patent No.: US 10,163,148 B1
(45) Date of Patent: Dec. 25, 2018

(54) WIRELESS BEACON SHOPPING EXPERIENCE

(71) Applicant: Square, Inc., San Francisco, CA (US)

(72) Inventors: Shuvo Chatterjee, San Francisco, CA (US); Rishi Garg, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 890 days.

(21) Appl. No.: 14/079,320

(22) Filed: Nov. 13, 2013

(51) Int. Cl.
*G06Q 30/00* (2012.01)
*G06Q 30/06* (2012.01)

(52) U.S. Cl.
CPC ..... *G06Q 30/0633* (2013.01); *G06Q 30/0631* (2013.01)

(58) Field of Classification Search
CPC ........ G06Q 40/00; G06Q 30/00; G06Q 30/02; G06Q 30/06; G06Q 30/0267
USPC .............................................. 705/35–44, 26.7
See application file for complete search history.

(56) References Cited

U.S. PATENT DOCUMENTS

| | | | | |
|---|---|---|---|---|
| 6,659,344 B2* | 12/2003 | Otto | ................... | G06K 17/0022 235/381 |
| 6,820,062 B1* | 11/2004 | Gupta | ................... | B62B 3/1408 705/16 |
| 8,050,984 B2* | 11/2011 | Bonner | .............. | G06Q 30/0261 705/26.7 |
| 8,396,485 B2 | 3/2013 | Grainger et al. | | |
| 2004/0093274 A1* | 5/2004 | Vanska | .................. | G01C 21/20 705/26.7 |
| 2005/0256782 A1* | 11/2005 | Sands | .................. | G06Q 10/087 705/26.41 |
| 2006/0200378 A1* | 9/2006 | Sorensen | ............. | G06Q 10/063 705/7.29 |
| 2006/0293968 A1* | 12/2006 | Brice | .................... | B62B 3/1424 705/14.63 |
| 2007/0118429 A1* | 5/2007 | Subotovsky | ........... | G06Q 30/02 705/26.9 |

(Continued)

OTHER PUBLICATIONS

Mark Chediak, "Retail Technology; Grocers Get a Taste of Future; Store Owners Who Want to Stand Out in the Crowd These Days are Embracing Cutting-Edge Services," The Orlando Sentinel, Jan. 21, 2006.*

(Continued)

*Primary Examiner* — Hani M Kazimi
(74) *Attorney, Agent, or Firm* — Polsinelli PC (57) ABSTRACT

Methods, systems, and apparatus, including computer programs encoded on computer storage media, for using wireless beacons to manage shopping lists. One of the methods includes receiving, from a user, a selection of one or more items available for purchase at a physical store location of a store. A user device receives a signal from a wireless beacon installed in a particular section of the physical store location, wherein the signal emitted by the wireless beacon identifies the particular section of the store. If one or more items in the shopping list are located in the particular section, the one or more identified items that are located in the particular section are presented on a display device of the user device such that they appear above one or more items in the shopping list data that are not located in the particular section.

20 Claims, 5 Drawing Sheets

(56) References Cited

U.S. PATENT DOCUMENTS

| | | | | |
|---|---|---|---|---|
| 2007/0138268 A1* | 6/2007 | Tuchman | ............... | G06Q 30/02 235/383 |
| 2008/0040219 A1* | 2/2008 | Kim | ...................... | G06O 30/02 705/14.26 |
| 2008/0059297 A1* | 3/2008 | Vallier | ................... | G06Q 30/02 705/14.27 |
| 2008/0189170 A1* | 8/2008 | Ramachandra | ........ | G06Q 30/02 705/7.29 |
| 2008/0249865 A1* | 10/2008 | Angell | ................... | G06Q 30/02 705/14.34 |
| 2015/0079942 A1* | 3/2015 | Kostka | ............... | G06Q 30/0633 455/411 |

OTHER PUBLICATIONS

Sangeetha Shekar, et al., "iGrocer—A Ubiquitous and Pervasive Smart Grocery Shopping System," In Proceedings of the 2003 ACM Symposium on Applied Computing (Melbourne, FL, Mar. 9-12, 2003), pp. 645-652.*

Raymond R. Burke, "The Third Wave of Marketing Intelligence," Retailing in the 21st Century, pp. 159-171, 2010.*

* cited by examiner

WIRELESS BEACON SHOPPING EXPERIENCE

BACKGROUND

This specification relates to wireless communication between devices.

Fixed radio receivers can also be used to triangulate a location of a mobile device. Mobile device locations can also be determined using Global Positioning System (GPS) signals.

BRIEF DESCRIPTION OF THE DRAWINGS

Like reference numbers and designations in the various drawings indicate like elements.

DETAILED DESCRIPTION

Wireless beacons installed in a physical store location can help a user to obtain information about products in the store and to maintain a shopping list using a mobile user device. Each wireless beacon can be installed in a particular section of a store. A user device can receive signals emitted by the wireless beacon to present information about the items in a virtual shopping list that are located in the particular section of the store.

For example, a user application installed on the user device can determine that a user has entered a particular section of a physical store location using information communicated by a wireless beacon assigned to that section of the store. The user application can then present items on the user's shopping list that are located in that particular section. The user application can also arrange the items on the shopping list in an order according to distance from the user's current location and can provide directions to items on the shopping list that have not yet been purchased. The user application can also use past purchases by the user to guide the user to those items in the physical store environment and suggest new items for purchase by the user. The user application can also use past purchase history and the user's location in the store to present manufacturer offers in real-time, e.g., a coupon to switch detergent brands.

In this specification, wireless beacons refer to devices that use direct radio signal communication to directly communicate information wirelessly to other devices using mid-range to short-range radio signal protocols. In other words, the wireless beacons can directly communicate using radio signals without interaction with any intermediary devices between the communicating devices. Furthermore, a device can communicate information using radio signals, e.g. a user identifier, to another device without the devices engaging in a pairing process that requires user input and without requiring explicit user authorization to communicate with another device. The direct radio signal communication functionality can be performed by any appropriate computing device, e.g. wristwatch, a mobile phone, a portable music player, a tablet computer, a laptop computer, a personal digital assistant, a smartphone, a keychain beacon, or another handheld or wearable mobile device to name a few examples. The radio signals emitted by the devices for such wireless communication can be part of any appropriate standard for mid-range to short-range radio communications having an operable range of at least 1 meter and up to about 50 meters, e.g., Bluetooth 4.0 and Bluetooth Low Energy (BLE). The radio signals described in this specification can be any appropriate type of signal, e.g., a broadcast or advertiser signal that indicates presence of the device to nearby devices, or a connection signal that transmits data to a connected nearby device, to name a few examples. In this specification, a device can be said to be "nearby" if the device is within the operable range for performing direct radio signal communication with another user device.

Figure 1:
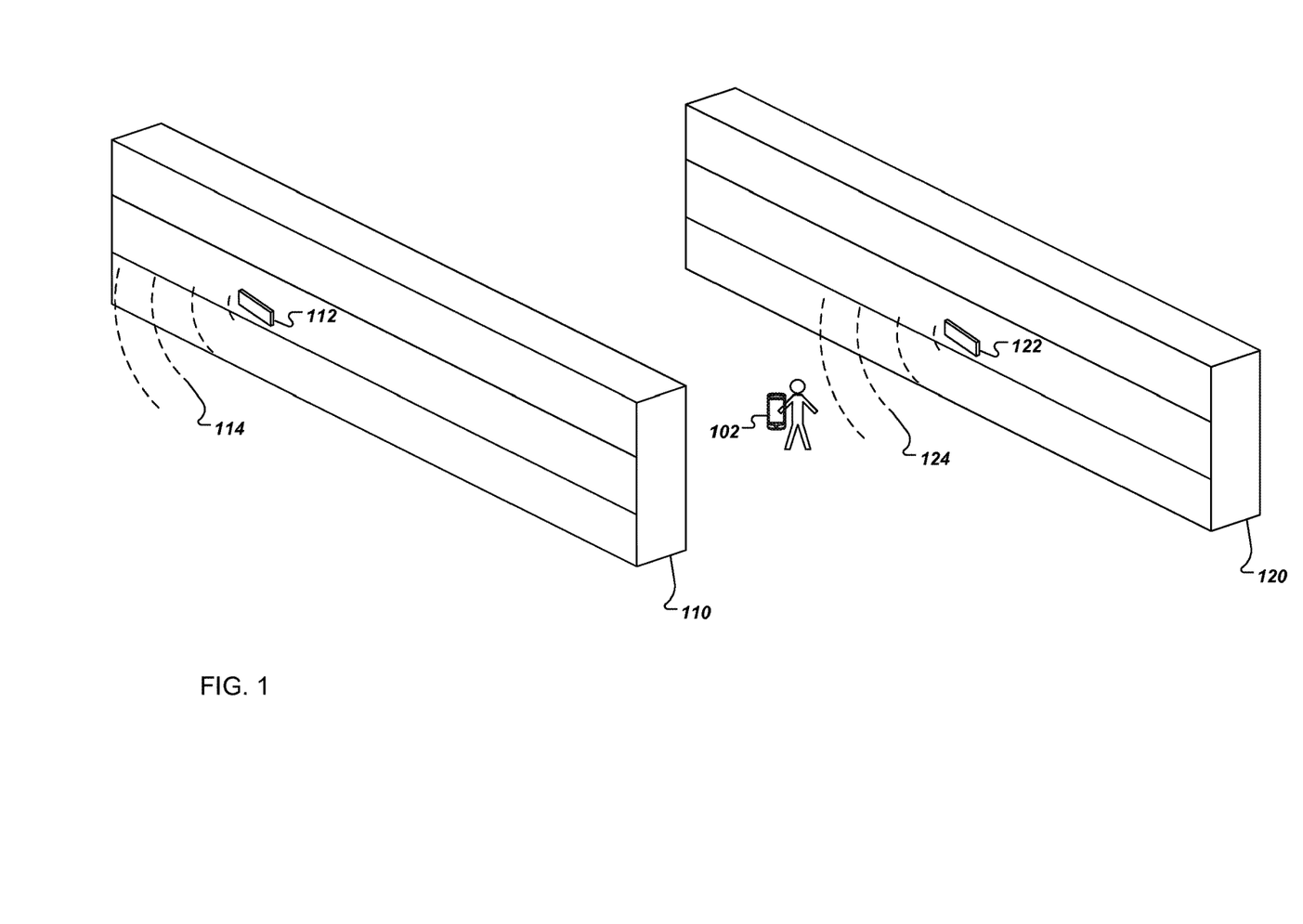
FIG. 1 illustrates a user inside a store that has installed wireless beacons.

FIG. 1 illustrates a user inside a store that has installed wireless beacons. A user holding a user device 102 stands between two store shelves 110 and 120. The user device 102 receives radio signals emitted by nearby wireless beacons in the store, e.g., the wireless beacons 112 and 122.

The wireless beacon 122 is installed, e.g., on the shelf 120, and emits a signal 124 that encodes information about a particular store section. For example, the signal 124 can encode the section-specific information, e.g., "Meats," to indicate that the wireless beacon 122 is installed in a section that includes meats. Nearby user devices, e.g., the user device 102, can use the information encoded in the signal 124 to present information about products sold in that section or about products on a user shopping list that are located in that section. The signal 124 can also encode product-specific information, e.g., "Laundry detergent" or brand specific information, e.g., "A1 brand laundry detergent" about products that are nearby.

The wireless beacon 112 is installed, e.g., on the shelf 110, in a different section of the store. Similarly, the wireless beacon 112 emits a signal 114 that can encode information about the different store section or nearby products or brands. The user device 102 may measure signal strength from nearby wireless beacons, and use the measurement to determine which wireless beacon is closest. The user device 102 may present information only for a closest wireless beacon or may blend or otherwise combine information relevant to information received multiple wireless beacons.

Because the user device 102 can receive the signals 114 and 124 using direct radio signal communication, an otherwise "offline" user device 102, e.g., a user device that has deactivated its WiFi and cellular data transceiver, can still obtain such information from the wireless beacons.

Figure 2:
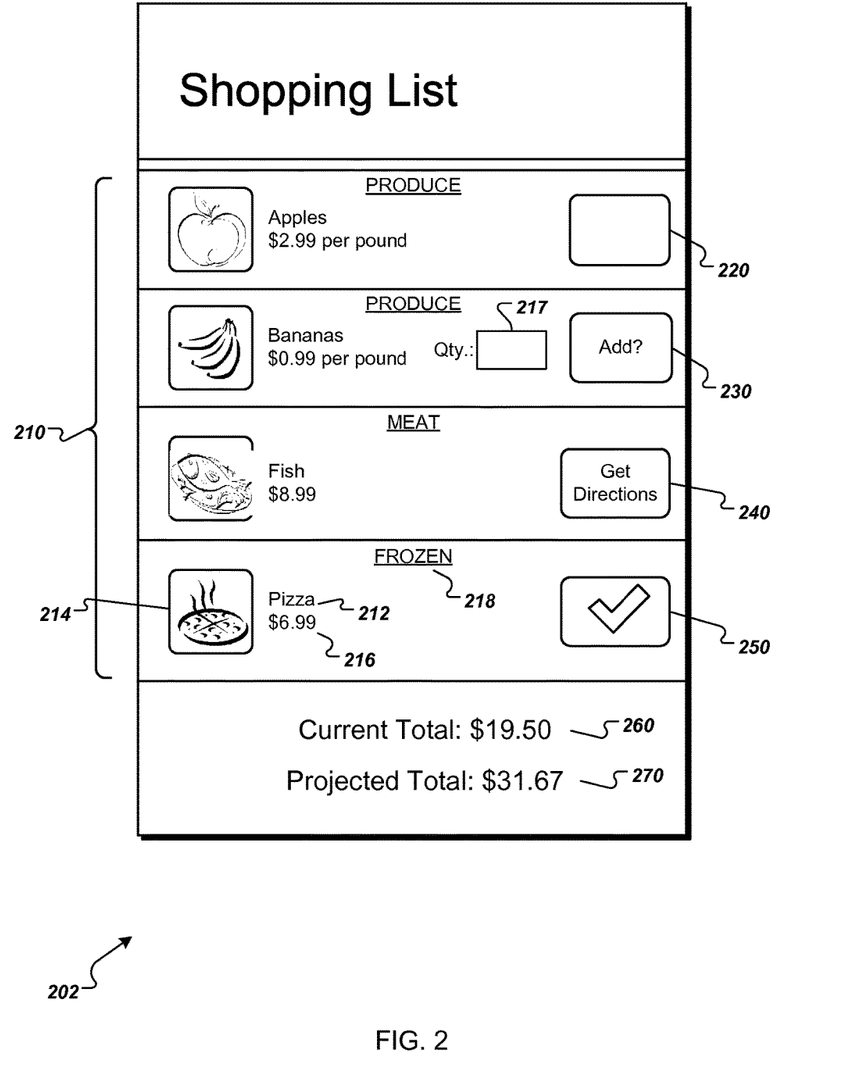
FIG. 2 is a diagram of an example view of a user interface of a user application installed on a mobile user device.

FIG. 2 is a diagram of an example view of a user interface 202 of a user application installed on a mobile user device. The example interface 202 can help a user to manage a shopping list using information obtained from wireless beacons installed in a store. Thus, a user device with poor indoor cellular reception or even an offline user device can present the information illustrated in FIG. 2 by using section information received directly from wireless beacons installed in the store.

The interface 202 presents a shopping list 210 of items on a display device of a mobile user device. The shopping list 210 is organized into rows, with each row including a name 212 of the item, e.g., "Pizza," an image 214 of the item, a price 216 of the item, e.g., "$6.99," and a store section 218 of the item. A row can also include an input field 217 to enter a quantity of an item purchased, e.g., a weight or a number.

The interface 202 includes icons that help a user manage the shopping list. A blank icon 220 indicates that a particular item has not yet been selected by the user. For example, the user can select the blank icon 220, e.g., after the user places the item in a physical shopping cart, which can change the blank icon 220 into a checked icon 250. Alternatively or in addition, the user application may automatically change a blank icon to a checked icon if certain criteria are met. For example, the user application can change a blank icon for a particular item to a checked icon if the user application detects that the user lingers for at least a threshold period of time at a particular section containing the particular item. Detection that the user has lingered at a particular section can be accomplished by detecting that the signal strength of the wireless beacon for that section has remained above a certain threshold for the threshold period of time. Other information, e.g., signal strength of other beacons or data from motion sensors in the user device can be used.

The user application can display an add icon 230 for an item in the shopping list when the user is near the item in question. The add icon 230 can serve as a suggestion to the user to look for the item in question and to add it to the physical shopping cart. Each row can also include a navigation icon 240 that the user can select to receive indoor navigation directions to the location of the item within the store.

The interface 202 also includes a current total 260 of items that have been added, e.g., as indicated by items having the checked icon 220. The interface 202 also includes a projected total 270 for all items in the shopping list.

A user can assemble the shopping list 210 before arriving at the store using a mobile device or another computing device, e.g., a desktop computer. The user can also assemble the shopping list as the user selects items in the store, in which case the user application may only present the current total 260 and not the projected total 270.

The user device can obtain one or more of the items of information in the example interface 202 directly from wireless beacons installed in the store. For example, price and other information can be obtained from a product-specific wireless beacon that is installed proximate to particular items within the store.

The user device can also use section-specific wireless beacons to arrange items in the shopping list. For example, if the user device receives a signal from a wireless beacon in the "Produce" section, the user device can order the shopping list so that produce items appear near the top of the list and remaining items appear in descending order. For example, if the meat section is further away than the frozen food section, the user device presents information about the fish item on the list above the pizza item on the list. For each of the items located in a closest section, the user application may present an add icon 230 to suggest to the user that the items be added to the physical shopping cart while the user is in that section.

Figure 3:
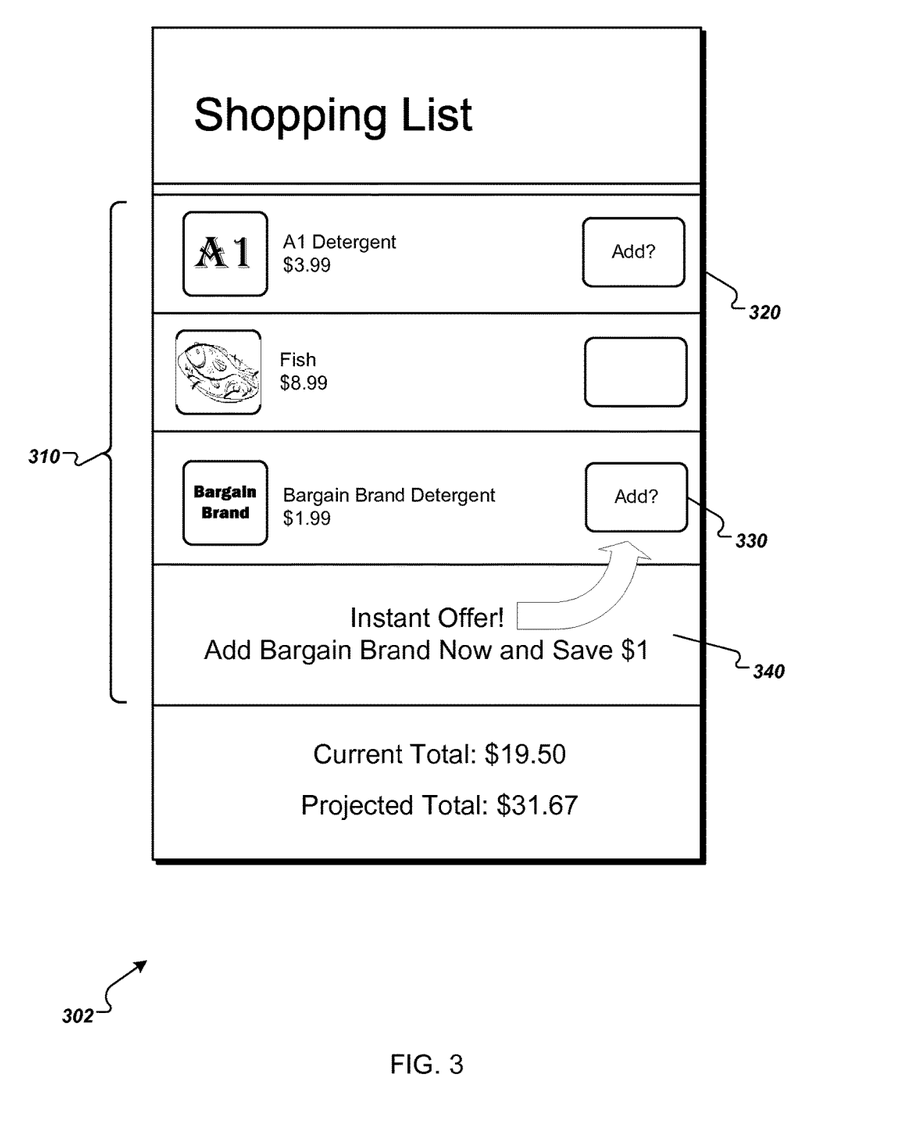
FIG. 3 is a diagram of an example view of a user interface of a user application installed on a mobile user device.

FIG. 3 is a diagram of an example view of a user interface 302 of a user application installed on a mobile user device. The example interface 302 can present real-time offers for nearby products. The user can thus easily compare prices and receive offers for items in a section of the store in which the user is currently located. The user interface 302 presents a list 310 of items in a shopping list organized into rows. The information presented for each item can be obtained directly from a wireless beacon installed in the store that is associated with each item or obtained from a serving system.

The user interface 302 can also present offer information 340 about a real-time for nearby items. For example, the offer information 340 indicates that the user can save $1 if the user purchases Bargain Brand Detergent. The offer information 340 can be triggered by the user having a particular item listed in a shopping list, e.g., A1 Detergent 320. The offer information 340 can also be triggered by the user being a particular section of the store, e.g., the detergent section, as determined by a signal received from a wireless beacon. The user can accept the offer by selecting an add icon 330 presented with the item information.

Figure 4:
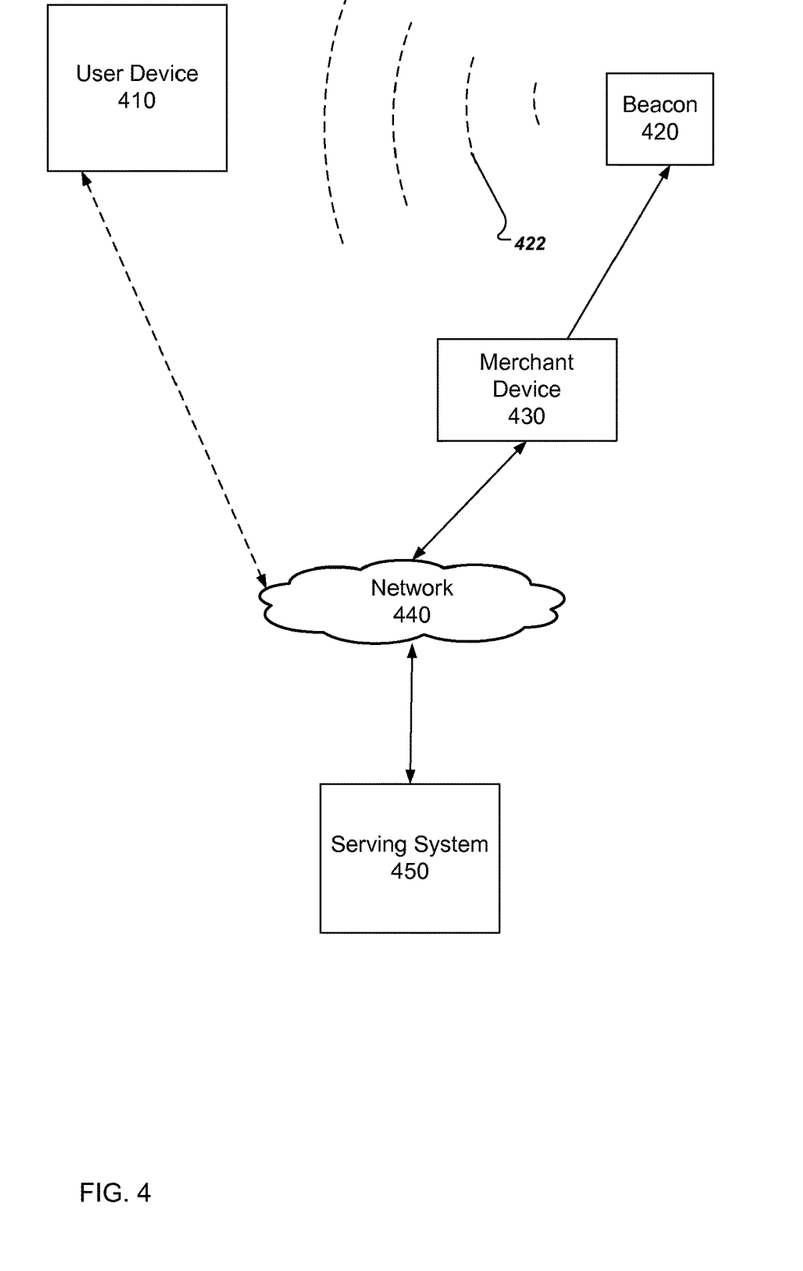
FIG. 4 is a block diagram of an example system.

FIG. 4 is a block diagram of an example system. The example system includes a user device 310, a wireless beacon 420, and a merchant device 430. The wireless beacon 420 can communicate directly with the user device 310 using direct radio signal communication with radio signals 422. The merchant device 432 can communicate with a serving system 450 over a network 440. The network 440 can be a wireless cellular network, a wireless local area network, a Wi-Fi network, a mobile telephone or another telecommunications network, a wired Ethernet network, a private network such as an intranet, a public network such as the Internet, or any appropriate combination of such networks. The user device 410 may or may not be configured to communicate with the serving system 450 over the network 340.

The merchant device 430 can install a merchant application received from the serving system 450 that can be used to configure the wireless beacon 420. In some implementations, the serving system 450 issues item and product-specific identifiers for specific items or products sold by the merchant, and which will be broadcast by the wireless beacon 420.

The user device 410 can install user application received from the serving system 450. The user application can be used to receive signals 422 from the wireless beacon 420 and to present, on a display device of the user device 410, a user interface that includes item information received from the wireless beacon 420.

Figure 5:
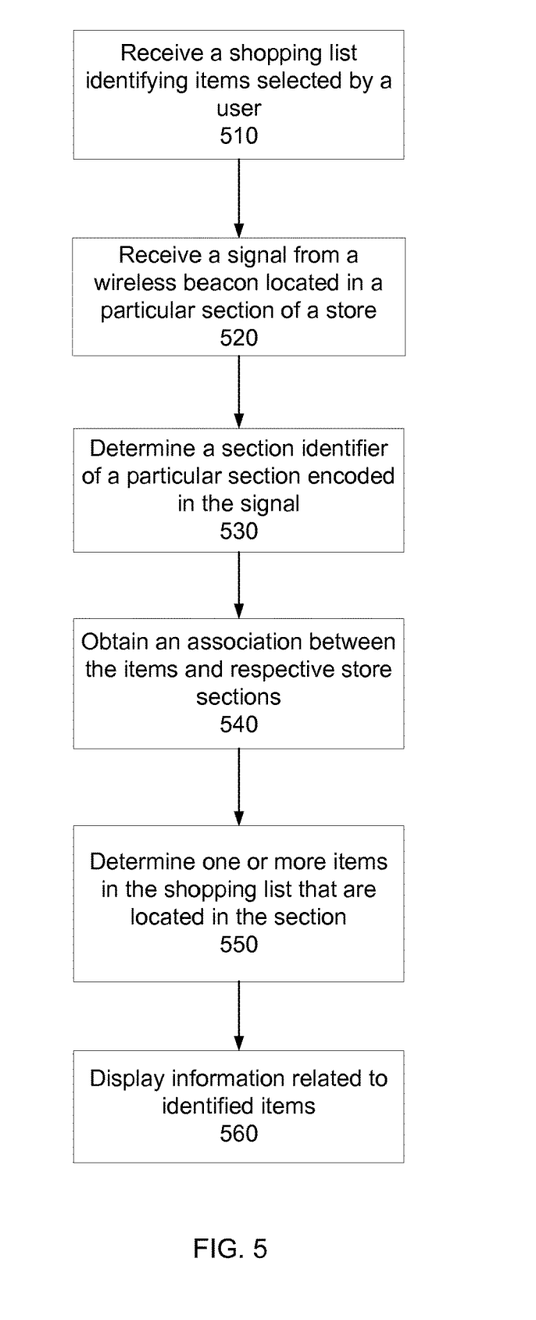
FIG. 5 is a flow chart of an example process for presenting information about items in a particular store section.

FIG. 5 is a flow chart of an example process for presenting information about items in a particular store section. In general, a user device receives a signal from a wireless beacon that encodes a store section. The user device then presents information about items that are located in the particular store section. The example process can be implemented by one or more computer programs installed on one or more computers. The process will be described as being performed by an appropriately programmed user device, e.g., the user device 310 of FIG. 3.

The user device obtains shopping list data identifying one or more items selected by a user (510). A user can create a virtual shopping list on the user device, using a desktop computer, or using another computing device. The shopping list stores item identifiers and other associated information for each item, e.g., a picture, a description, a price, a manufacturer, a website URL, to name a few examples. The item identifiers can be maintained by the serving system, the item manufacturers, a merchant, or another party.

The shopping list can be stored on the user device or can be stored at a serving system in an account associated with the user. The user device can then access the shopping list for display to the user through an application installed on the user device. The user device can access the shopping list from local storage of the user device, or the user device can access the shopping list at a serving system over a network.

The user device receives a signal from a wireless beacon located in a particular section of a store (520). The wireless beacon can be part of a number of wireless beacons installed throughout a physical store location. For example, a merchant can divide the store into a number of sections and install a wireless beacon in each section. The merchant can use a merchant device to program each wireless beacon to broadcast a section identifier for the appropriate section.

The merchant can obtain section identifiers from a serving system that uses a global categorization of store sections across merchants. For example, the section identifiers can correspond to different grocery store sections, e.g., meat, dairy, produce, to different clothing store sections, e.g., men, women, boys, girls, or to any other appropriate store division or categorization. The merchant can communicate with a serving system to obtain the global section identifiers. The merchant can then use a merchant device to program wireless beacons in each section to broadcast the appropriate section identifier.

The user device determines a section identifier from the signal (530). The user device may first engage in an automatic pairing process with the wireless beacon in which one or more packets are exchanged between the devices in order to set up direct radio signal communication between the devices. The user device can then obtain a section identifier encoded in the signal emitted by the wireless beacon.

If the user device receives signals from multiple wireless beacons, the user device can choose a closest wireless beacon, e.g., by comparing the strength of the signal received from each wireless beacon. In some implementations, the user device can select sections identifiers corresponding to multiple wireless beacons.

The user device obtains an association between the items in the shopping list and respective store sections (540). The association provides information about in which sections particular items in the shopping list are located within the store. The association can be defined by a serving system, the merchant, or another party.

For example, the merchant can use a merchant device to upload, to a serving system, an association between items for sale in the store and associated store sections. The user device can then access the association uploaded by the merchant. For example, if apples are an item on the shopping list, the user device can obtain an association between apples and an identifier for the produce section of the store.

The user device determines one or more items in the shopping list that are located in the section (550). The user device can use the association between the items in the shopping list and respective store sections to identify items that are located in the section of the store determined by the wireless beacon.

The user device displays information related to the one or more items (560). The user device can present a variety of information about items located in the section. For example, the user device can present only a list of items that are located in the section, along with information about the items, e.g., a description, a price, and whether the item has already been selected for purchase by the user. The user device can display a suggestion icon, e.g., an "Add" icon, for items that are in the section but have not yet been selected by the user. If the user device is receiving signals from multiple wireless beacons from different store sections, the user device can generate a blended list of items from the multiple sections.

The user device can also present items in the shopping list in an order, with items determined to be in the section first in a list. In addition, unselected items within the determined section can be presented above items that the user has indicated as being selected. The user device may also arrange items in other sections in an increasing order by distance to the current section, as measured from the current section or a location of the user device. The user device can also present an option to obtain a map of the store or navigation directions to other items in the shopping list.

The user device can also automatically determine that the user has selected one or more items for purchase, e.g., by placing the items in a physical shopping cart. For example, if the user device has remained near a particular section for a threshold period of time, e.g., at least 1 minute, the user device can automatically determine that the user has selected the items in that section for purchase.

The user device can also automatically determine that the user has selected an item for purchase from a wireless device installed in a physical shopping cart. For example, the shopping cart can have installed on it a device that communicates with item-specific wireless beacons embedded in or coupled to the items themselves. The shopping cart beacon can then communicate with the user device to provide item identifiers of the items that are determined to be in the shopping cart. The shopping cart device can determine that items are in the shopping cart by computing a measurement of signal strength emitted by the item-specific wireless beacons embedded in the items.

The user device can also obtain information about current offers for one or more items in the section and present the offers when the user is determined to be in the section. The user can redeem the offer by selecting the item mentioned in the offer and carrying through with the purchase of the item.

The offers can be identified by a serving system based on various criteria, in addition to the user being located in a particular section of the store. For example, the offers can be identified based on items in the shopping list of the user. The serving system can identify offers for the items currently in the user's shopping list, or the serving system can identify offers for products that are competing with or otherwise related to the products in the shopping list.

The serving system can also identify offers based on the purchase history of the user. For example, if the user has purchased a particular brand in the past, the serving system can identify offers for products based on that particular brand or on a competing brand. The serving system can also identify offers for products that other people have purchased with products in the user's shopping list.

The serving system can also identify offers based on regularity of a particular purchase by the user. For example, if the user typically buys milk once per week, the serving system can identify offers for milk if the user is in the milk section and about a week has passed since the user last purchased milk. The serving system can also use pattern matching to determine items that users typically purchase when in particular store sections. For example, the serving system may determine that users that buy milk also typically buy diapers when in the diaper section of the store. Thus, if the user has milk in the shopping list, the serving system can present an offer for diapers when the user is in the diaper section of the store.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificiallygenerated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
   receiving, via a user interface presented on a user device, a selection of one or more items available for purchase at a physical store location of a store;
   storing, on the user device, the selection of the one or more items as a shopping list;
   receiving, by a receiver on the user device, a signal from a wireless beacon installed in a particular section of the physical store location, wherein the signal emitted by the wireless beacon identifies the particular section of the physical store location;
   determining that the user device is currently located in the particular section based on the signal from the wireless beacon;
   determining, by an application executing at least partly on the user device, a first subset of the one or more items in the shopping list that are located in the particular section;
   responsive to a determination that the first subset of the one or more items are located in the particular section and without further input via the user interface, dynamically modifying an order of the shopping list, wherein a modified shopping list comprises the first subset of the one or more items above a second subset of the one or more items;
   presenting the modified shopping list on a display of the user device;
   determining, by the application executing at least partly on the user device, that a signal strength of the signal from the wireless beacon has remained above a threshold level for a threshold period of time; and
   based at least in part on a determination that the signal strength has remained above the threshold level for the threshold period of time, automatically displaying an indication that at least one item of the first subset of the one or more items on the shopping list has been selected for purchase.

2. The method of claim 1, further comprising:
   presenting a suggestion to add an item to a physical shopping cart for each item of the first subset of the one or more items.

3. The method of claim 1, further comprising:
   presenting offer information related to an item of the first subset of the one or more items.

4. A computer implemented method comprising:
   receiving, via a user interface presented on a user device, shopping list data that identifies one or more items of a shopping list, wherein each item of the one or more items is associated with a respective section of a physical store location;
   determining, by the user device, that a user has entered a particular section of the physical store location based at least in part on a signal received by a receiver of the user device from a wireless beacon installed in the particular section of the store, wherein the signal identifies the particular section;
   determining, by an application executing at least partly on the user device, a first subset of the one or more items of the shopping list that are located in the particular section;
   based at least in part on a determination that the first subset of the one or more items are located in the particular section, automatically modifying an order of the shopping list without further input via the user interface, wherein a modified shopping list comprises the first subset of the one or more items above a second subset of the one or more items; and
   presenting, via the user interface on the user device, a suggestion to add an item to the modified shopping list for each item of the first subset of the one or more items that are located in the particular section.

5. The method of claim 4, further comprising presenting, via the user interface presented on the user device, the modified shopping list.

6. The method of claim 5, further comprising:
   generating a ranking of the one or more items in the modified shopping list, wherein items in the first subset of the one or more items occur higher in the ranking than other items that are not located in the particular section.

7. The method of claim 6, wherein the ranking of the one or more items is based on a computed distance from the location of the user device to respective sections for the one or more items in the modified shopping list.

8. The method of claim 4, further comprising:
   receiving a user selection of a particular item of the first subset of the one or more items; and presenting an indication that the particular item has been selected.

9. The method of claim 8, further comprising:
reordering the first subset of the one or more items in the shopping list in response to receiving the user selection of the particular item, wherein items that have not been selected occur higher in the order than items that have been selected.

10. The method of claim 4, further comprising:
determining that the user has remained in the particular section for at least a threshold period of time; and
automatically designating one or more items of the first subset of the one or more items as having been selected by the user.

11. The method of claim 4, further comprising:
obtaining an offer related to one or more items of the first subset of the one or more items; and
presenting the offer on the user interface presented on the user device.

12. The method of claim 11, wherein the offer is based on a purchase history of the user.

13. A system comprising:
a wireless beacon located in a particular section of a store, wherein the wireless beacon is configured to emit a signal that encodes a section identifier of the particular section; and
a user device that is configured to:
receive, via a user interface, shopping list data that identifies one or more items of a shopping list, wherein each item of the one or more items is associated with a respective section of a physical store location;
receive, by a receiver, the signal emitted by the wireless beacon located in the particular section;
determine the section identifier from the received signal;
determine a first subset of the one or more items of the shopping list that are located in the particular section;
responsive to a determination that the first subset of the one or more items are located in the particular section and without further input via the user interface, dynamically modify an order of the one or more items of the shopping list, wherein a modified order comprises the first subset of the one or more items above a second subset of the one or more items; and
present, on a display, a suggestion to add an item to a list of selected items for each item of the first subset of the one or more items.

14. A non-transitory computer-readable medium storing software comprising instructions executable by one or more computers which, upon such execution, cause the one or more computers to perform operations comprising:
receiving, via a user interface presented on a user device, shopping list data that identifies one or more items of a shopping list, wherein each item of the one or more items is associated with a respective section of a physical store location;
determining that the user device is currently located in a particular section of the physical store location based at least in part on a signal received by a receiver of the user device from a wireless beacon installed in the particular section of the store, wherein the signal identifies the particular section;
determining a first subset of the one or more items of the shopping list that are located in the particular section;
based at least in part on a determination that the first subset of the one or more items are located in the particular section, automatically, and without further input via the user interface, modifying an order of the shopping list, wherein a modified shopping list comprises the first subset of the one or more items above a second subset of the one or more items; and
presenting, via the user interface on the user device, a suggestion to add an item to the modified shopping list for each item of the first subset of the one or more items.

15. The computer-readable medium of claim 14, wherein the operations further comprise presenting, via the user interface presented on the user device, the modified shopping list.

16. The computer-readable medium of claim 15, wherein the operations further comprise:
generating a ranking of the one or more items in the shopping list, wherein items in the first subset of the one or more items occur higher in the ranking than other items that are not located in the particular section.

17. The computer-readable medium of claim 16, wherein the ranking of the one or more items is based on a computed distance from a location of the user device to respective sections for the one or more items in the shopping list.

18. The computer-readable medium of claim 14, wherein the operations further comprise:
receiving a user selection of a particular item of the first subset of the one or more items; and
presenting an indication that the particular item has been selected.

19. The computer-readable medium of claim 18, wherein the operations further comprise:
reordering the first subset of the one or more items in the shopping list in response to receiving the user selection of the particular item, wherein items that have not been selected occur higher in the order than items that have been selected.

20. The computer-readable medium of claim 14, wherein the operations further comprise:
determining that the user device has remained in the particular section for at least a threshold period of time; and
automatically designating the first subset of the one or more items as having been selected by the user.

* * * * *